United States Patent [19]

Massieu et al.

[11] Patent Number: 5,397,885
[45] Date of Patent: Mar. 14, 1995

[54] HAND-HELD BARCODE LABEL READER WITH INCREASED DEPTH OF FIELD

[75] Inventors: Jean-Louis Massieu, Montauban; Jean-Michel Puech, Toulouse, both of France

[73] Assignee: Reflexion Plus, Chatou, France

[21] Appl. No.: 174,301

[22] Filed: Dec. 29, 1993

[30] Foreign Application Priority Data

Jan. 11, 1993 [FR] France ................. 93 00159

[51] Int. Cl.$^6$ ............................................. G06K 7/10
[52] U.S. Cl. ................................. 235/462; 235/472
[58] Field of Search ............... 235/462, 472, 454; 359/196

[56] References Cited

U.S. PATENT DOCUMENTS

| | | | |
|---|---|---|---|
| 4,742,220 | 5/1988 | Beyor | 250/216 X |
| 4,743,773 | 5/1988 | Katana et al. | 250/566 X |
| 4,866,258 | 9/1989 | Ueda et al. | 235/472 O |
| 5,166,820 | 11/1992 | Fujita | 359/211 O |
| 5,280,161 | 1/1994 | Niwa | 235/462 O |

FOREIGN PATENT DOCUMENTS 0197673 10/1986 European Pat. Off. .

*Primary Examiner*—Donald Hajec
*Assistant Examiner*—Michael G. Lee
*Attorney, Agent, or Firm*—Fitch, Even, Tabin & Flannery

[57] ABSTRACT

A barcode label reader comprises a read window having a longer dimension parallel to an X axis and a lens system with an optical axis Y substantially normal to the window at its center which projects a conjugate image of a read line of the label onto a CCD type strip which is scanned sequentially to form a signal representing the barcode carried by the label. A strip of light-emitting diodes is disposed outside the X-Y plane to illuminate the label through the read window. A prismlike lens in the form of two refractors separated by a slot in the X-Y plane deflects the beam emitted by this strip so that it is substantially parallel to the X-Y plane. Thus, the depth of field of the reader is limited only by the aperture of the lens system.

5 Claims, 1 Drawing Sheet

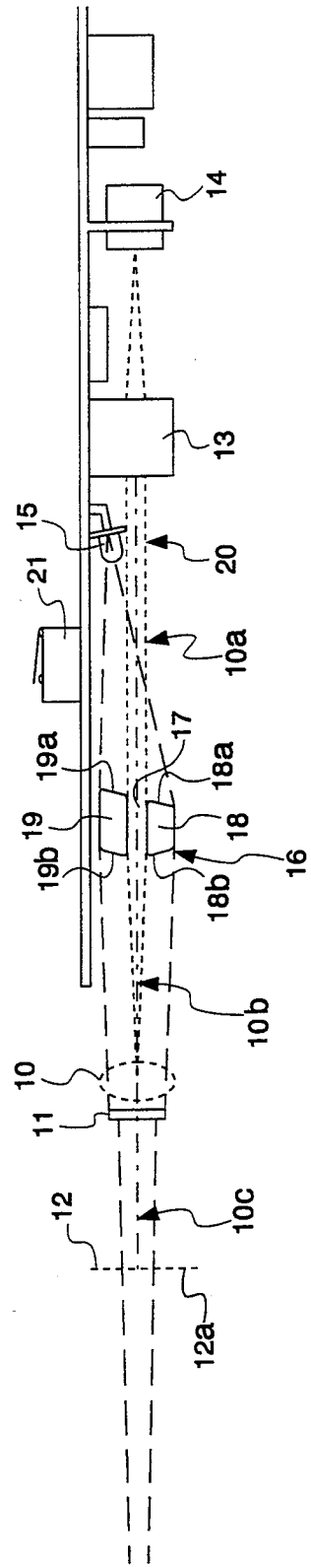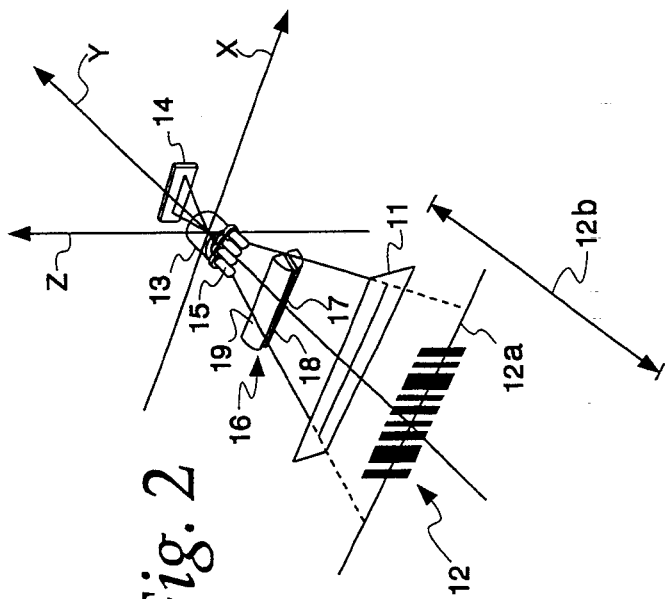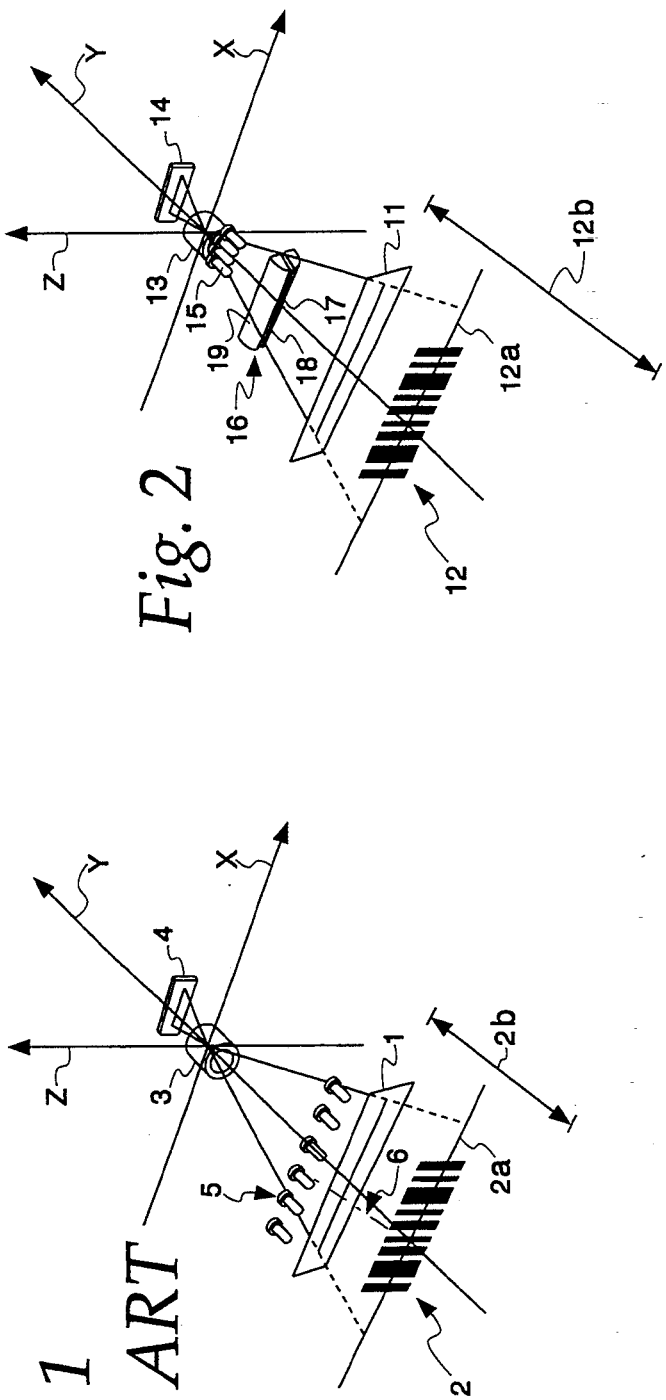

HAND-HELD BARCODE LABEL READER WITH INCREASED DEPTH OF FIELD

BACKGROUND OF THE INVENTION

1. Field of the Invention

The invention concerns a hand-held barcode label reader with an oblong read window which is offered up substantially parallel to the label with a longer dimension transverse to the bars. The reader includes a lens system with an optical axis normal to the window at its center and adapted to project a conjugate image of the label onto a photosensor strip. The photosensor strip comprises a multiplicity of receiver elements which are electrically scanned sequentially and aligned in a sighting plane containing the optical axis and parallel to the longer dimension of the window and a light source outside the sighting plane emitting through the window towards the label a beam which is spread out parallel to the longer dimension of the window.

2. Description of the Prior Art

The barcode system is extremely widely used to show the reference codes of articles of all kinds in a form suitable for automatic capture so that these reference codes can be identified without a person having to read them visually. The product details are coded on a rectangular label by a succession of straight elements or bars transverse to the direction of the sequence and alternately dark and light, having widths which are integer multiples of a unit width (the multiplying factor is usually between 1 and 3). The label is read by optically scanning it in the longitudinal direction at approximately constant speed to produce an electrical signal embodying the reference code carried by the label and suitable for computer processing.

Probes, which are moved by hand to scan the label, have been used for reading the labels; the difficulty of performing the manual scanning at constant speed makes these probes difficult to use efficiently; the scanning often has to be repeated several times and the response is slow. The trend is to discard this type of probe in favor of readers with a built-in scanner.

There are two main types of readers with a built-in scanner, "hand-held" readers so-called, as they are small in size, are moved over the label, and fixed readers have the article moved over a read window.

In fixed readers, a concentrated narrow light beam is deflected by rotating optics, and a photosensitive receiver registers a light signal formed by the light backscattered from the concentrated beam scanning the label.

The general construction of modern hand-held readers is explained above. The label is illuminated by a luminous flux that is practically fixed during reading, and its image is projected by the lens system onto the photosensor strip. The receiver elements are scanned sequentially to form the electrical signal representing the code carried by the label. The scanning is repeated cyclically, and as the reader moves towards the label, the image formed by the lens system on the photosensor strip becomes progressively more clearly focussed until the label is in the conjugate plane of the photosensor strip. As a corollary to this, the scanning signal becomes progressively better defined. The photosensor strip control device analyzes the signal and validates it, as soon as its definition is satisfactory.

The specifications of the lens system (focal length and aperture) define a depth of field within which the label code can be read unambiguously; this depth of field can be determined by the man skilled in the art.

However, modern hand-held readers have a depth of field which is limited for a different reason, namely the conditions under which the label is illuminated. The reader must be relatively insensitive to the ambient light, which implies the use of a light source integrated into the reader with a spectrum different from that of the ambient lighting, and this light source must direct onto the label a luminous flux sufficiently intense to enable the use of a small aperture lens system to provide a satisfactory depth of field.

The light source must be outside the sighting plane, as it would otherwise intercept the image of the label intended to fall onto the photosensor strip if the light source were in front of the strip, while the latter would intercept the beam emitted by the source if the latter were behind the strip.

The median plane, along which the beam from the light source is spread, conventionally forms with the sighting plane a dihedron, whose line of intersection lies parallel to the longer dimension of the read window in the conjugate plane of the photosensor strip. If the label moves away from this conjugate plane, the section of the label in the sighting plane, which is imaged on the strip, is illuminated only by a marginal portion of the beam emitted by the source; the useful illumination reduces with the distance between the label and the conjugate plane of the strip at a rate which is directly proportional to the angle of the dihedron between the median plane of the beam and the sighting plane. The light backscattered by the label has a maximum in a plane symmetrical to the incident plane of the beam relative to a plane normal to the label. All these factors contribute to reducing the usable depth of field of conventional hand-held readers.

If the beam from the light source is concentrated to increase the illumination near the median plane of the beam, the decrease in the illumination on moving away from the median plane is accentuated, and the gain in terms of depth of field is minimal; there may even be no improvement at all or a deterioration.

SUMMARY OF THE INVENTION

To remedy the insufficient depth of field of conventional hand-held readers, the invention proposes a hand-held barcode label reader having an oblong read window which is offered up substantially parallel to the label with a longer dimension transverse to the bars. The reader includes a lens system with an optical axis near the normal to said window at its center and adapted to project a conjugate image of said label onto a photosensor strip. The photosensor strip comprises a plurality of receiver elements, which are sequentially scanned electrically, arranged in a row in a sighting plane containing the optical axis and parallel to the longer dimension of said window. A light source outside said sighting plane emits towards said label through said window a beam spread out parallel to said longer dimension of said window, in which reader said beam passes through a prismlike lens with edges parallel to said longer dimension of said window and made up of two refractors disposed on respective opposite sides of a slot through which said sighting plane passes so that the emergent beam is substantially symmetrical relative to said sighting plane.

It follows from the above definition of the construction of the reader that in the "active" area in which the label is located the illumination beam is generally directed parallel to the sighting plane; accordingly, the part of the label intercepted by the sighting plane is in the central area of the illumination beam, whatever the distance between the label and the read window, although the source of illumination and the lens system/photosensor strip combination do not block each other. The overall depth of field is therefore the same as that defined by the specifications of the lens system, and this depth of field of the lens system can be increased by relying on the high sensitivity of modern photosensor strips to enable masking of the lens system.

The two refractors preferably have cylindrical diopters with generatrices parallel to the prism edges so that the emergent beam is substantially parallel to the sighting plane. Thus, the refractors combine with the angular deflection of the light rays at a convergence such that the light source is substantially at the focus of the cylindrical lenses defined by the successive diopters through which the beam passes. As the illumination beam is parallel to the sighing plane in the active area, there is virtually no variation in the illumination of the label as the distance between the label and the read window varies, and, consequently, the illumination does not limit the depth of field.

The light source preferably comprises a strip of emitter elements in a row parallel to the longer dimension of the window. This approximates a linear source while enabling use of "off the shelf" components, such as light-emitting diodes which emit in the far red. This reduces the sensitivity of the reader to ambient light while avoiding a level of backscattering from the bars significantly different from the level of backscattering with white light.

The photosensor strip is preferably of the charge-couple device (CCD) type with a photosensitive surface divided into adjoining areas separated by potential walls produced by voltages applied to interleaved comb electrodes. During an exposure phase, the potential walls are fixed and the adjoining areas form potential wells in which charges released photoelectrically accumulate at a rate dependent on the locally received luminous flux. During a subsequent scanning phase, modulated signals applied to the electrodes cause progressive displacement of all the walls towards an output electrode at one end of the strip. The charges accumulated in the potential wells are entrained by the walls and flow sequentially into the output electrode, so forming an electrical signal representing the image acquired in the exposure phase. These CCD strips are highly sensitive, among other reasons, because of the accumulation of charges in the potential wells during the exposure phase, associated with a good response in the long wavelength part of the spectrum.

Secondary features and advantages of the invention will emerge from the following description given by way of example with reference to the appended drawings.

BRIEF DESCRIPTION OF THE DRAWINGS

FIG. 1 is a diagrammatic perspective view of a prior art hand-held barcode reader.

FIG. 2 is a similar view of a reader in accordance with the invention.

FIG. 3 is a side view of the main components of a reader in accordance with the invention.

DETAILED DESCRIPTION OF THE PREFERRED EMBODIMENT

The prior art reader shown in FIG. 1 has an elongate rectangular window 1 with its longer dimension parallel to an axis X. An axis Y near the normal to the window 1 at its center constitutes the optical axis of the reader. A barcode label 2 to be read is disposed parallel to the window 1 with the bars transverse to a read line 2a which intersects the optical axis Y. On the optical axis Y, and on the opposite side of the read window 1 to the label 2, a lens system has its main axis coincident with the optical axis Y of the reader. The orthogonal frame of reference comprising the axis X parallel to the longer dimension of the window, the optical axis Y of the reader, and the axis Z substantially parallel to the bars of the label 2 is shown centered at the optical center of the lens system 3, as is usual. The plane containing the optical axis Y and the axis X parallel to the longer dimension of the window is called the sighting plane X-Y. The X-Z plane normal to the optical axis substantially defines the orientation of the plane of the label and the plane of the read window. The Y-Z plane normal to the sighting plane and containing the optical axis Y is the cross-section plane on which the path of the light rays is seen most clearly.

A photosensor strip 4, including a row of receiver elements adapted to be scanned sequentially by electrical means, is disposed with its row of receiver elements in the sighting plane X-Y and parallel to the axis X, which defines the orientation of the longer dimension of the read window 1. The strip 4 may be of the charge-coupled device (CCD) type whose construction and operation are discussed above.

The strip 4 is placed in a plane conjugate to that of the label 2 relative to the lens system 3, with the result that the lens system forms on a the strip 4 an image of the section of the label 2 along the read line 2a. This of course refers to the label 2 in its optimum position, and the aperture of the lens system 3 defines, around this optimum position, a depth of field that can be calculated by conventional means allowing for the required image resolution.

An illumination strip 5 comprising a row of light-emitting diodes, emitting in the far red for the reasons already explained, is disposed parallel to the longer dimension of the window (and therefore to the axis X), outside the sighting plane X-Y and (projected onto this plane) between the lens system 3 and the read window 1 and near the latter. Disposing the strip 5 outside the sighting plane prevents it from constituting an obstacle on the path of the beam backscattered by the label 2 in the sighting plane X-Y.

However, disposing the strip 5 outside the sighting plane X-Y means that the active illumination plane (as defined by the alignment of the strip 5 and the read line 2a) forms with the sighting plane X-Y a dihedron 6 with a line of intersection 2a. From the above discussion of the effective depth of field, it is clear that the oblique arrangement 6 of the illumination beam combined with the aperture of the window 1 along the Z axis causes a restricted depth of field 2b.

In the selected embodiment shown in FIGS. 2 and 3, the reader comprises, like the prior art reader shown in FIG. 1, a read window 11, a lens system 13 and a photosensor strip 14, the relative disposition of which determines a sighting plane X-Y and an optimum plane for reading a barcode label 12 along a read line 12a. A light source 15 in the form of a strip of emitter elements or light-emitting diodes in a row parallel to the longer dimension of the window 11, i.e., parallel to the axis X, is disposed outside the sighting plane X-Y but (projected onto this plane) near the lens system 13. The X-Z and Y-Z planes of the orthogonal frame of reference are defined in the same manner as previously defined.

As can be seen more clearly in FIG. 3 (a view in cross-section on the Y-Z plane), a prismlike lens 16 is disposed on the path of a beam 10 emitted by the strip 15 towards the label 12. The prismlike lens 16 has edges parallel to the X axis and, therefore, parallel to the longer dimension of the window 11. It comprises two refractors or elementary prisms 18 and 19 respectively below and above the sighting plane X-Y relative to the strip 15, defining a constant thickness slot 17 between them through which the sighting plane X-Y passes. Consequently, the beam, backscattered by the reading line 12a towards the lens system 13 and the photosensor strip 14, passes through this gap.

The refractors 18 and 19 have on the side facing the strip 15 a plane face or diopter 18a, 19a inclined to the X-Z plane normal to the sighting plane X-Y (FIG. 2). On the opposite side, they have cylindrical faces or diopters 18b, 19b with generatrices parallel to the X axis, like the edges of the prismlike lens, and whose chordal plane is inclined to the X-Z plane in the opposite sense to the plane diopters 18a, 19a. The prism (dihedron) angles between the faces 18a, 19a, and the chordal plane of the respective faces 18a, 19b are such that, given the refractive index of the optical material from which the prism is made, light rays from the strip 15 impinging on the faces 18a, 19a are deflected so that they emerge substantially parallel to the sighting plane X-Y. The radii of the cylindrical diopters 18b, 19b are determined, allowing for the refractive index, so that the focal length in the cross-section plane Y-Z is substantially equal to the distance between the strip 15 and the optical center of the prismlike lens 16. By virtue of these arrangements, the illumination beam 10 has three sections in transverse cross-section on the Y-Z plane: a first section 10a diverging from the strip 15 to the prismlike lens 16; a second section 10b from the window of the prismlike lens 16 to the read window 11, comprising two layers substantially parallel to the sighting plane X-Y separated by a gap which narrows in the direction towards the read window 11; and a third section 10c masked by the window 11 and comprising a single layer resulting from merging of the two layers of the section 10b. Thanks to the slot 17, the beam 20 backscattered by the read line 12a towards the lens system 13 is not masked by the prismlike lens 16. Nor is this beam 20 masked by the strip 15. As the refractors 18 and 19 intercept the marginal light rays of the beam 20 to redirect them towards the strip 15, the beam 20 is masked by the slot 17 for its path between the prismlike lens 16 and the lens system 13, with the result that the strip 15 may be located at a relatively small distance from the sighting plane X-Y.

The description just given of the formation of the beam for illuminating the label 12 has been restricted to first order optics, for reasons of clarity of explanation. Of course, second order corrections are introduced to optimize the illumination beam. Thus, the plane entry faces 18a and 19a of the refractors 18 and 19 are generally inclined relative to the X-Z plane so that the two layers of the section 10b of the beam 10 converge and merge in the plane of the read window 11. Also, the radii of curvature and the centers of curvature (in the Y-Z plane) of the cylindrical diopters 18b and 19b are determined to achieve very slight convergence of the emergent beam 10a, 10c and cooperate with the faces of the plane diopters 18a, 19a to deflect the illumination beam without introducing unwanted irregularities of illumination into the active beam 10c.

The resulting illumination of the label 12 by the strip 15 hardly varies with the distance between the label and the read window 11. The depth of field 12b in FIG. 2 is limited only by the aperture of the lens system 13, which is compatible with the sensitivity of the photosensor strip 14. Under conditions where a prior art reader as shown in FIG. 1 has a depth of field 2b of 2 cm, a reader in accordance with the invention as shown in FIG. 2 would have a depth of field of 10 cm.

Note that there are limits to the increase in the depth of field beyond which further improvement would be illusory. These limits result in particular from the difficulty of orienting the reader correctly relative to the label, which increases with the distance between the read window 11 and the label 12, and the reduced width of the read line image 12a formed on the photosensor strip 14.

Naturally, everything stated with reference to the prior art in regard of the spectral width of the light source and the use of a CCD photosensor strip 4 is applicable to the present invention also.

Note further that the causes of limitation of the depth of field associated with the geometry of the optics are complemented by causes relating to the quantified nature of the arrangement of the receiver elements on the photosensor strip. If the pitch of the strip, i.e., the distance between the centers of two consecutive receiver elements, is in the same order of magnitude as the gap between bars of the bar code in the image of the label 12 projected onto the strip 14 by the lens system 13, then the transitions between the dark and light bars will not be reproduced in the right place in the scanning signal. The resolution of the photosensor strip, expressed as the number of receiver element per unit length, must therefore be much greater than the resolution of the label image expressed as the number of unit intervals per unit length. Where electrical information signals are concerned, the resolution of the strip is analogous to a signal/noise ratio.

It goes without saying that the photosensor strip 14 is associated with electrical control and signal processing circuits such that the charges stored in the potential wells of the CCD strip are periodically transferred sequentially to an output electrode to form a signal that is analyzed to determine if it contains information representing a barcode, and, if so, decoded to provide an output signal compatible with the associated equipment.

It is sufficient for a label to be presented to the reader in an appropriate relative position for an output signal to be produced. The reader includes an indicator lamp which lights when a signal is generated. The reader can therefore remain in service continuously. If its frequency of use is relatively low, it may be beneficial to provide the reader with a trigger 21 which is pressed to switch the reader from a standby state to an active state.

Of course, the invention is not limited to the example described but encompasses all variant executions thereof within the scope of the claims.

In particular, it would be possible to dispose an inclined mirror between the prismlike lens and the outlet window in order to bend the sighting plane into an obtuse dihedron with the line of intersection parallel to the longer dimension of the window, in order to facilitate the reading gesture.

There is claimed:

1. Hand-held barcode label reader having an oblong rear window which is offered up substantially parallel to the label with a longer dimension transverse to the bars, the reader including a lens system with an optical axis near the normal to said window at its center and adapted to project a conjugate image of said label onto a photosensor strip comprising a plurality of receiver elements which are sequentially scanned electrically, arranged in a row in a sighting plane containing the optical axis and parallel to the longer dimension of said window, and a light source outside said sighting plane emitting towards said label through said window a beam spread out parallel to said longer dimension of said window, in which reader said beam passes through a prismlike lens with edges parallel to said longer dimension of said window and made up of two refractors disposed on respective opposite sides of a slot through which said sighting plane passes so that the emergent beam is substantially symmetrical relative to said sighting plane.

2. Label reader according to claim 1 wherein said two refractors have cylindrical diopters with generatrices parallel to the edges of the prismlike lens so that said emergent beam is substantially parallel to said sighting plane.

3. Label reader according to claim 1 wherein said light source comprises a strip of emitter elements in a row parallel to said longer dimension of said window.

4. Label reader according to claim 3 wherein said emitter elements are light-emitting diodes emitting in the far red.

5. Label reader according to claim 1 wherein said photosensor strip is of the charge-coupled device type.

* * * * *